Patented Jan. 29, 1946

2,393,889

UNITED STATES PATENT OFFICE 2,393,889

PREPARATION OF N,N'-DICYCLOALIPHATIC-p-PHENYLENEDIAMINES

Elmer W. Cook, New York, N. Y., and William D. Thomas, Jr., Stamford, Conn., assignors to American Cyanamid Company, New York, N. Y., a corporation of Maine No Drawing. Application November 29, 1941, Serial No. 421,037

1 Claim. (Cl. 260—397.7)

This invention relates to new organic compounds, particularly N,N'-dicycloaliphatic-p-phenylenediamines, and their preparation.

We have discovered that N,N'-dicycloaliphatic-p-phenylene-diamines, which we believe to be new compounds, may be prepared by a method to be presently described and that such compounds are effective antioxidants and may be employed as such to stabilize and prevent the deterioration of such materials as fats, and oils including drying oils and essential oils, rubber, aldehydes, rosin size, synthetic resins, photographic developers, and petroleum products. Compounds of the present invention are particularly valuable in preventing gum formation in cracked gasolines in which they are effective in very small amounts of the order of 5 to 200 parts per million.

Although certain aryl and alkyl substituted N,N'-p-phenylene-diamines have been employed as antioxidants we have found that the N,N'-dicycloaliphatic-p-phenylenediamines of the present invention are particularly advantageous. We attribute their greater effectiveness as gasoline antioxidants to the fact that each of the two nitrogen atoms of the p-phenylenediamine nucleus is attached to but one secondary carbon atom and one hydrogen atom. For some reason not known to us at present gum inhibitors having this structure are of greater effectiveness. In addition to possessing this structure the compounds of our invention possess a number of other advantages which make their use as gasoline antioxidants highly desirable. The particular compounds to be described and claimed herein have a marked solubility in gasoline and their incorporation therein may be easily accomplished. They are, on the other hand, quite insoluble in water and since gasoline is generally stored over water they are not thereby extracted from the gasoline as frequently happens when using water soluble gum inhibitors. The compounds of the present invention are also insoluble in alkaline solutions and are not extracted from the gasoline by residual alkalies left in the gasoline after refining operations. A further and important advantage of the compounds of the present invention is that should they be oxidized by high temperatures, compounds such as N,N'-diphenyl-p-phenylenediamine would be formed which are also effective as antioxidants.

The compounds of the present invention may be prepared by mixing approximately 2 moles of a cycloaliphatic ketone with one mole of p-phenylenediamine and treating the mixture with hydrogen in the presence of a hydrogenation catalyst. The cycloaliphatic ketones which may be employed include those such as cyclohexanone, methyl cyclohexanone, dimethyl and trimethyl cyclohexanones, ethyl, propyl, butyl and amyl mono-, di- and tri-substituted cyclohexanones, cyclopentanone, methyl cyclopentanone, cycloheptanones and the like.

The reaction whereby the N N' dicycloaliphatic-p-phenylenediamines of the present invention are produced may be illustrated by the following equation, using cyclohexanone as the cycloaliphatic ketone:

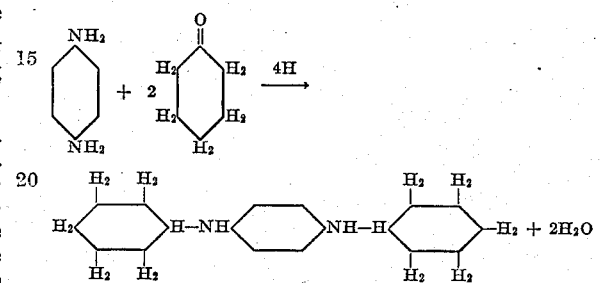

Although it has not been definitely established it would appear that during the course of this reaction a compound of the following type is first obtained.

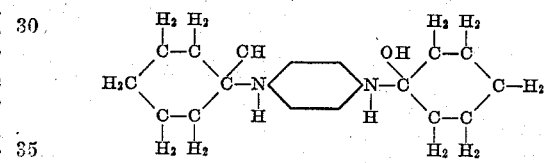

which then splits out water to form dicyclohexylidine-p-phenylenediamine

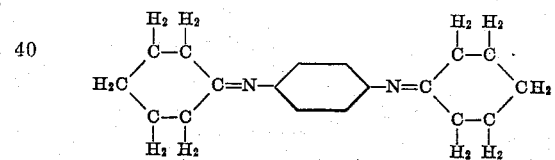

This latter compound is easily reduced by hydrogen to yield N N' dicyclohexyl-p-phenylenediamine as illustrated above.

The catalytic reduction is carried out with one of the many conventional hydrogenation catalysts available such as copper chromite, Raney nickel, nickel-copper, platinum black, palladium black, nickel-alumina, nickel, copper, nickel-thoria, etc. or combinations thereof. The reduction is carried out at temperatures preferably ranging from 100 to 200° C. and at pressures within the range 500–2000 pounds per square inch. The time required may vary from 1 hour up to 10 or more hours depending upon the temperature, pressure and activity of the catalyst. In conducting this hydrogenation it is most convenient to dissolve the reactants in an inert mutual solvent as for example alcohols such as isopropyl alcohol, amyl alcohol etc., and various ethers and hydrocarbons. An excess of the ketone itself may also be employed.

The preparation of our new compounds will now be illustrated in greater detail in the following example. It will be understood, of course, that this particular example is given merely for purposes of illustration and is not intended to be in limitation of our invention since as pointed out above other cycloaliphatic ketones, hydrogenation catalysts and reaction conditions may be employed if desired.

*Example*

54 parts by weight of p-phenylenediamine and 196 parts by weight of cyclohexanone were dissolved in 116 parts by weight of isopropyl alcohol and 14 parts of copper chromite added thereto as catalyst. The reaction was carried out in a pressure autoclave at a temperature of 150–170° C. and a pressure varying from 1000–1670 pounds per square inch over a period of 1.5 hours. After reduction the catalyst was filtered off and the solvent removed by evaporation. N N' dicyclohexyl-p-phenylenediamine remained as a pinkish-red colored oil that crystallized on standing. The crude product thus obtained has a melting point of around 55° C. and was readily soluble in alcohols, gasoline, benzene and other common organic solvents.

The N,N'-dicycloaliphatic-p-phenylenediamines prepared as described above may in some cases be used as antioxidants as they come directly from the hydrogenation autoclave. For other uses, however, it may be desirable to further purify them by distillation in vacuo.

What we claim is:

N,N'-di-cyclohexyl-p-phenylene diamine.

ELMER W. COOK.
WILLIAM D. THOMAS, Jr.